US012719071B2

(12) United States Patent
Shao et al.

(10) Patent No.: US 12,719,071 B2
(45) Date of Patent: Aug. 25, 2026

(54) COMPOSITE HIGH-TEMPERATURE PROTON EXCHANGE MEMBRANE FOR FUEL CELL, PREPARATION METHOD THEREFOR AND USE THEREOF

(71) Applicant: DALIAN INSTITUTE OF CHEMICAL PHYSICS, CHINESE ACADEMY OF SCIENCES, Dalian (CN)

(72) Inventors: Zhigang Shao, Dalian (CN); Bo Lv, Dalian (CN)

(73) Assignee: DALIAN INSTITUTE OF CHEMICAL PHYSICS, CHINESE ACADEMY OF SCIENCES, Dalian (CN)

(*) Notice: Subject to any disclaimer, the term of this patent is extended or adjusted under 35 U.S.C. 154(b) by 662 days.

(21) Appl. No.: 18/245,393

(22) PCT Filed: Aug. 17, 2021

(86) PCT No.: PCT/CN2021/112975
§ 371 (c)(1),
(2) Date: Mar. 15, 2023

(87) PCT Pub. No.: WO2022/057549
PCT Pub. Date: Mar. 24, 2022

(65) Prior Publication Data
US 2024/0030474 A1 Jan. 25, 2024

(30) Foreign Application Priority Data
Sep. 15, 2020 (CN) ......................... 202010969077.5

(51) Int. Cl.
*C08J 3/205* (2006.01)
*C08J 5/22* (2006.01)
(Continued)

(52) U.S. Cl.
CPC ......... *H01M 8/1048* (2013.01); *C08J 3/2053* (2013.01); *C08J 5/2287* (2013.01);
(Continued)

(58) Field of Classification Search
CPC .. H01M 8/1048; H01M 8/103; H01M 8/1067; H01M 8/1088; H01M 8/1097;
(Continued)

(56) References Cited

U.S. PATENT DOCUMENTS

2012/0135278 A1* 5/2012 Yoshie .................... H01M 8/20
429/105
2013/0210610 A1* 8/2013 Veith ........................ B01J 35/45
977/773
(Continued)

FOREIGN PATENT DOCUMENTS

CN 106188590 A 12/2016
CN 106336518 A * 1/2017
(Continued)

OTHER PUBLICATIONS

Ingabire, Providence Buregeya et al.; "Titanium oxide/graphitic carbon nitride nanocomposites as fillers for enhancing the performance of SPAES membranes for fuel cells"; Journal of Industrial and Engineering Chemistry; vol. 91, Aug. 11, 2020; ISSN:1266-086X; pp. 213-222.

(Continued)

*Primary Examiner* — Christian Roldan
(74) *Attorney, Agent, or Firm* — NKL Law; Allen Xue

(57) ABSTRACT

A composite high-temperature proton exchange membrane for a fuel cell is prepared using materials include PBI and composite A@B and phosphoric acid. A is nanoparticles with a free radical quenching function and B is $C_3N_4$ having a nanosheet structure. The mass fraction of composite A@B is 0.05-2 wt. % and the mass ratio of A to B in A@B is
(Continued)

1:1-1:20. Composite A@B is firstly prepared, and A@B is then ultrasonically dispersed with a strong polar aprotic solvent to obtain a dispersion S1. PBI solution S2 is obtained from PBI and a strong polar aprotic solvent. S1 and S2 are uniformly mixed and stirred to obtain a casting solution S3, which is cast on plate glass with a groove. The membrane is then soaked in phosphoric acid after dying to obtain a composite membrane for a high-temperature proton fuel cell.

7 Claims, 2 Drawing Sheets

(51) Int. Cl.

| | |
|---|---|
| ***C08K 9/02*** | (2006.01) |
| ***H01M 8/103*** | (2016.01) |
| ***H01M 8/1048*** | (2016.01) |
| ***H01M 8/1067*** | (2016.01) |
| ***H01M 8/1088*** | (2016.01) |
| *B82Y 30/00* | (2011.01) |
| *B82Y 40/00* | (2011.01) |
| *H01M 8/1097* | (2016.01) |

(52) U.S. Cl.

CPC ............... *C08K 9/02* (2013.01); *H01M 8/103* (2013.01); *H01M 8/1067* (2013.01); *H01M 8/1088* (2013.01); *B82Y 30/00* (2013.01); *B82Y 40/00* (2013.01); *C08J 2379/04* (2013.01); *H01M 8/1097* (2013.01)

(58) Field of Classification Search

CPC .... H01M 8/1051; H01M 8/124; C08J 3/2053; C08J 5/2287; C08J 2379/04; C08J 5/2256; C08J 7/14; C08K 9/02; B82Y 30/00; B82Y 40/00; Y02E 60/50

USPC .......................................................... 429/492

See application file for complete search history.

(56) References Cited

U.S. PATENT DOCUMENTS

| | | | | |
|---|---|---|---|---|
| 2020/0131650 | A1* | 4/2020 | Kumar .................... | H01M 8/16 |
| 2022/0209271 | A1* | 6/2022 | Kim .................... | H01M 8/1053 |
| 2022/0263108 | A1* | 8/2022 | Kim .................... | H01M 4/8668 |

FOREIGN PATENT DOCUMENTS

| | | | |
|---|---|---|---|
| CN | 106543460 | A | 3/2017 |
| CN | 108091891 | A | 5/2018 |
| CN | 108183250 | A | 6/2018 |
| CN | 108772094 | A | 11/2018 |
| CN | 109794277 | A | 5/2019 |
| CN | 110444795 | A | 11/2019 |
| CN | 111244513 | A | 6/2020 |
| CN | 111342095 | A | 6/2020 |

OTHER PUBLICATIONS

Bai, Huijuan et al., "Simultaneously enhancing ionic conduction and mechanical strength of poly(ether sulfones)-poly (vinyl pyrrolidone) membrane by introducing graphitic carbon nitride nanosheets for high temperature proton exchange membrane fuel cell application", Journal of Membrane Science, vol. 558, Jul. 15, 2018, pp. 26-33.

Hao, Jinkai et al., "Degradation reduction of polybenzimidazole membrane blended with Ce02 as a regenerative free radical scavenger", Journal of Membrane Science, vol. 522, Jan. 15, 2017, pp. 23-30.

Liu, Yue et al., "Immobilized phosphotungstic acid for the construction of proton exchange nanocomposite membranes with excellent stability and fuel cell performance", International Journal of Hydrogen Energy, vol. 45, No. 35, Jul. 10, 2020, pp. 17782-17794.

Lu, Yao et al., "Improved performance of quaternized poly(arylene ether ketone)s/graphitic carbon nitride nanosheets composite anion exchange membrane for fuel cell applications", Applied Surface Science, vol. 503, Feb. 15, 2020, pp. 1-38.

Niu, Wenhan et al., "Graphitic Carbon Nitride for Electrochemical Energy Conversion and Storage", ACS Energy Letters, vol. 3, No. 11, pp. 2796-2815.

Qin, Bowen et al., "A novel Ir/CeO2—C nanoparticle electrocatalyst for the hydrogen oxidation reaction of alkaline anion exchange membrane fuel cells", RSC Advances, No. 50, 2017, pp. 31574-31581.

* cited by examiner

COMPOSITE HIGH-TEMPERATURE PROTON EXCHANGE MEMBRANE FOR FUEL CELL, PREPARATION METHOD THEREFOR AND USE THEREOF

TECHNICAL FIELD

The present invention belongs to the technical field of proton exchange membrane fuel cells, in particular to a composite high-temperature proton exchange membrane for fuel cells and a preparation method therefor.

BACKGROUND

Proton exchange membrane fuel cell (PEMFC) is an energy conversion device capable of directly converting chemical energy into electrical energy, which will continuously output electrical energy as long as it is continuously supplied with oxidizing agents and reducing agents. High-temperature proton exchange membrane fuel cell has become one of the currently studied hotspot due to its high cell energy efficiency, good tolerance to CO, and simple hydrothermal management system. When polybenzimidazole is used in high-temperature proton exchange membrane fuel cells, it must be doped with as much phosphoric acid as possible to ensure high proton conductivity. However, high phosphoric acid doping will cause a rapid reduction of mechanical strength and increase the loss rate of phosphoric acid during the operation of the cell, thereby affecting the overall performance of the cell. In addition, the doped phosphoric acid is easy to lose, which affects the service life. After doping phosphoric acid, the mechanical strength and the dimensional stability of the membrane are reduced.

In order to solve the above problems, Patent CN106543460A discloses a method for doping CNT@$Fe_3O_4$@C in a membrane, which improves the proton conductivity and the ability of blocking fuel, but the improvement of membrane conductivity must be performed by means of gas humidification. Under the condition of low humidification or no humidification, it is difficult to improve the performance of the composite membrane. Patent CN106188590A discloses a method for preparing an amino-functionalized metal-organic skeleton structure (I-$MOFNH_2$) and then doping the structure into a polymer. The proton exchange membrane has excellent proton conductivity and low fuel permeability under both high and low humidity conditions. However, MOF-based materials are easily decomposed and have poor stability under the conditions of high-temperature working conditions and concentrated phosphoric acid. Patent CN108183250A discloses a method for doping mesoporous $SiO_2$ in a membrane, which can improve proton conductivity under a low humidification condition. However, due to the fact that $SiO_2$ does not conduct protons, nor can it anchor protonic acid and improve the mechanical strength of the membrane, so that this method cannot achieve the performance of high-temperature proton composite membrane under non-humidification condition. In conclusion, a high-temperature proton exchange membrane with high proton conductivity, high mechanical strength, high thermal stability, high dimensional stability, and oxidation resistance is lacked in the art.

SUMMARY OF THE INVENTION

In order to solve the shortcomings in the prior art, the present invention provides a composite membrane for a high-temperature proton exchange membrane fuel cell with good proton conductivity and mechanical strength, and provides a preparation method therefor. The composite membrane has good mechanical performances and conductivity, and shows good performances when applied to fuel cells.

To achieve the above purpose, the present invention adopts the following technical solutions:

The present disclosure provides a composite high-temperature proton exchange membrane, the raw materials thereof include polybenzimidazole, composite A@B and phosphoric acid, where A is nanoparticles with free radical quenching function, B is $C_3N_4$ with a nanosheet structure. A mass fraction of the composite A@B is 0.05-2 wt. %, and a mass ratio of A to B in the composite A@B is 1:1-1:20.

Based on the above technical solution, preferably, the composite A@B is that A loads on B, a diameter of the nanoparticles A is 2-10 nm, and a thickness of the nanosheet B is 4-10 nm.

Based on the above technical solution, preferably, the polybenzimidazole is at least one of mPBI (poly 2,2'-(m-phenyl)-5,5'-bibenzimidazole), ABPBI (poly(2,5-benzimidazole)), OPBI (poly 2,2'-(p-diphenyl ether)-5,5'-bibenzimidazole), PBI with sulfonic acid group side chain, PBI with phosphonic acid group side chain, and hyperbranched PBI.

The A is at least one of $MnO_2$, $Mn_2O_3$, $Fe_3O_4$, $TiO_2$ and $CeO_2$ composites.

The B is at least one of graphene nanosheet, BN nanosheet and $C_3N_4$ nanosheet.

Based on the above technical solution, preferably, the composite A@B is that nanoparticles $CeO_2$ load on nanosheet $C_3N_4$.

Based on the above technical solution, preferably, a preparation method of the composite A@B is as follows: mixing a two-dimensional nanosheet material with a precursor of the nanoparticles with free radical quenching function to prepare a suspension; adding 0.5-2.5 M KOH solution into the suspension so that the pH value of the suspension is 12-14, stirring and centrifuging the suspension to obtain a solid precipitate, washing the precipitate with water to neutral, and calcining the precipitate after drying to obtain the composite A@B.

For example, the preparation method, when A is $CeO_2$ and B is sheet $C_3N_4$, is as follows:

(1) calcining dicyandiamide after grinding, grinding the calcined dicyandiamide into powder, washing the power with 0.25-1.5M hydrochloric acid solution for 0.5-3 hours and with deionized water for 0.5-2 hours respectively, and drying the obtained solid for standby;

(2) mixing the solid obtained in step (1) with cerous nitrate to prepare a suspension, adding 0.5-2.5M KOH solution into the suspension so that the pH value of the suspension is 12-14, stirring and centrifuging the suspension to obtain a solid precipitate, washing the precipitate with water to neutral, and calcining the precipitate after drying to obtain composite $CeO_2$@$C_3N_4$, where the mass ratio of dicyandiamide to cerium nitrate is 15:1-5:1.

Based on the above technical solution, preferably, the calcining conditions are of heating from room temperature to 500-600° C. with a heating rate of 3-8° C. $min^{-1}$ in an air atmosphere, and maintaining the temperature for 3-6 hours after heating to a set temperature; the drying temperature is 60° C.; and the calcining conditions in step (2) are of calcining for 2 hours in an air atmosphere at 250° C.

The present invention also provides a preparation method of the above composite high-temperature proton exchange membrane, including the following steps of:

(1) ultrasonically dispersing the composite A@B with a strongly polar aprotic solvent, and preparing a dispersion liquid S1 after ultrasonically dispersing for a period time;

(2) dissolving polybenzimidazole (PBI) in the strongly polar aprotic solvent, and obtaining a PBI solution S2 after stirring and heating; and (3) obtaining a casting solution S3 after mixing S1 and S2, casting S3 onto a grooved plate glass to obtain a membrane, and soaking the membrane in phosphoric acid after drying.

Based on the above technical solution, preferably, a mass concentration of the composite A@B in the dispersion liquid S1 in step (1) is 0.05-2 mg/10 ml, and a mass fraction of polybenzimidazole in the solution S2 in step (2) is 0.8-5 wt. %.

The aprotic solvents in steps (1) and (2) are independently at least one of N, N-dimethylformamide (DMF), N,N-dimethylacetamide (DMAc) and N-methyl-2 pyrrolidone (NMP).

In step (1), and ultrasonic power is 50-300 W and an ultrasonic time is 0.5-6 hours. In step (3), a mixing mode is magnetic stirring with a stirring power of 50-100 W and a stirring time of 1-12 hours.

A concentration of phosphoric acid for soaking the polybenzimidazole membrane is 50-85%, an soaking temperature is 50-150° C., and an soaking time is 6-24 hours.

The present invention also provides an use of the composite high-temperature proton exchange membrane in fuel cells.

Beneficial Effects

1. In the composite membrane of the present invention, the nanoparticles uniformly distributed on the surface of the composite can quench the generated free radicals in situ, thereby significantly reducing the oxidation of the PBI main chain, so as to prolong the service life of the membrane and slows the degradation rate of the membrane. The nanosheets in the main structure of the composite can increase the amount of phosphoric acid adsorption and reduce the loss rate of phosphoric acid through acid-base anchoring and physical adsorption, and the proton conductivity can be improved by building a proton-conductive auxiliary network within the membrane. The nanosheet structure can greatly improve the proton conductivity and mechanical strength of the composite membrane, enhance the mechanical strength, and improve the proton conductivity of the membrane.

2. Further preferably, the composite of the present invention is $CeO_2@C_3N_4$, two nano-materials in a loading form in the composite $CeO_2@C_3N_4$ can act synergistically to achieve a simultaneous improvement of proton conductivity, mechanical strength and oxidation resistance. By regulating the proportional relationship between the two in the composite, the amount of $CeO_2$ is moderate and $CeO_2$ is uniformly distribution on the surface of $C_3N_4$ is uniform, so that the tolerance to the free radicals can be improved without reducing the conductivity and tensile strength.

DETAILED DESCRIPTION OF DRAWINGS

FIG. 1 shows scanning electron microscope diagrams of the nano-composite $CeO_2@C_3N_4$ involved in Embodiment 1, Comparative examples 1, 2, and 4 of the present invention. Panel a-Embodiment 1, panel b-Comparative example 1, panel c-Comparative example 2, and panel d-Comparative example 4.

DETAILED DESCRIPTION OF PREFERRED EMBODIMENTS

Figure 1:
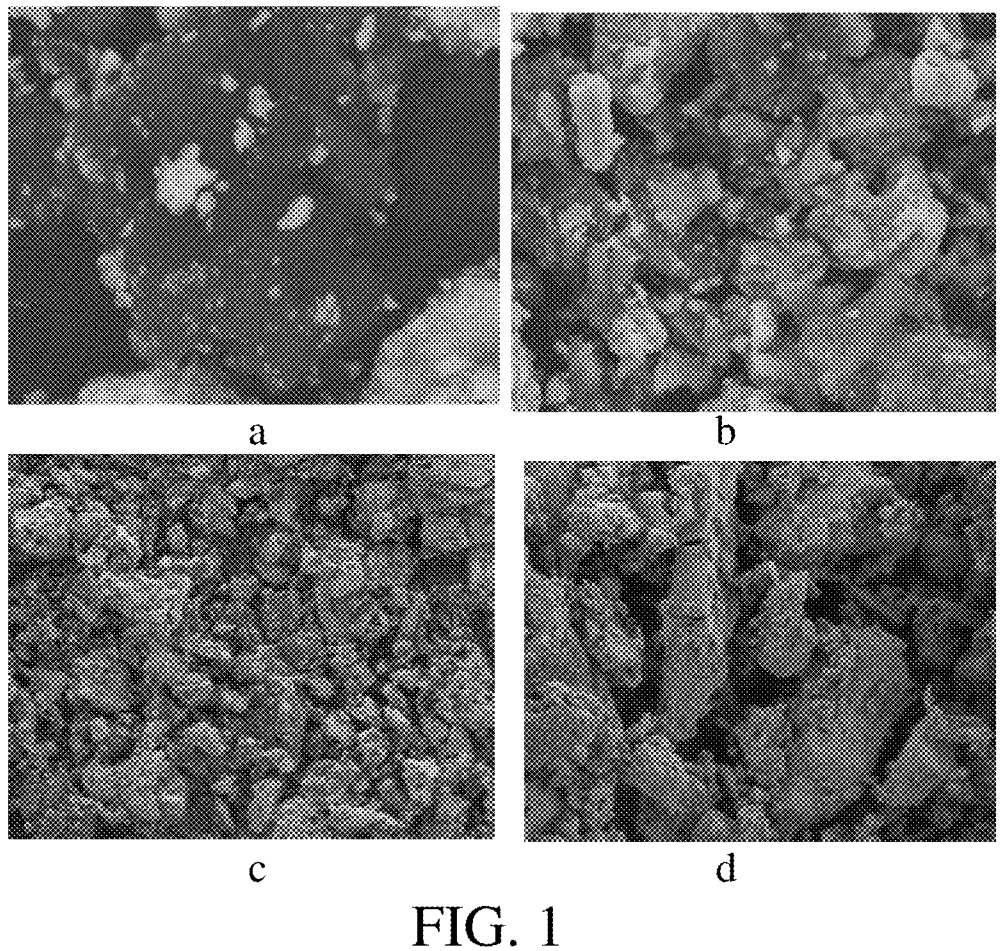
Figure 2:
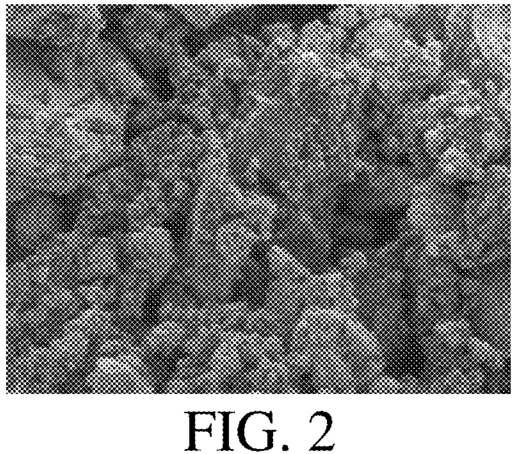
FIG. 2 is a scanning electron microscope diagram of $CeO_2$ in Comparative example 3.

The present invention is further described below with reference to specific embodiments, but is not limited in any way. The synthesis methods of the three hyperbranched PBI in the present application can refer to Journal of Membrane Science 593 (2020) 117435.

Embodiment 1

Taking polybenzimidazole and $CeO_2@C_3N_4$ as the raw materials, the composite high-temperature proton exchange membrane was prepared according to the following steps:

Step 1: 15 g of dicyandiamide was weighed and was placed in a crucible after sufficient grinding, then the crucible was put in a tubular furnace for calcination, and the tubular furnace was heated from room temperature to 550° C. with a heating rate of 5° C. $min^{-1}$ under an air atmosphere; the temperature was maintained for 4 hours after the temperature is increased to the set temperature, then the temperature was decreased along with the furnace; the calcined dicyandiamide was transferred into a mortar and was carefully ground into powder, and then the powder was washed with 1 M hydrochloric acid solution for 1.5 hours and with deionized water for 2 hours, respectively, and the obtained solid was dried in an oven at 60° C. Then the dried solid was mixed with 0.2 g of cerium nitrate, and then 50 g of deionized water was added to the mixture and magnetically stirred for 1 hour to obtain a suspension. Subsequently, 1 M KOH solution was added to the suspension to adjust the pH value of the suspension to 13, and then a solid precipitate was obtained by centrifugation after magnetic stirring for 2 hours. The solid precipitate was washed with large amounts of deionized water until the solution pH was neutral. Finally, the materials were completely dried in an oven and calcined at 250° C. for 2 hours under an air atmosphere, so that the composite $CeO_2@C_3N_4$ was obtained.

Step 2: 0.12 mg of the composite $CeO_2@C_3N_4$ was weighed and 10 ml of NMP was measured to mix, and the mixture was ultrasonically dispersed at an ultrasonic power of 100 W for 4 hours to obtain a dispersion liquid S1. 0.27 g of mPBI (poly-2,2'-(m-phenyl)-5, 5'-bibendazole) and 30 g of NMP were weighed, mixed and magnetically stirred, so that a PBI solution S2 was obtained after sufficient dissolution. S1 and S2 were uniformly mixed with stirring at a stirring power of 50 W for 6 hours to obtain a casting solution S3.

Step 3: the casting solution S3 was poured onto a grooved plate glass, and the plate glass was vacuum-dried at 80° C. for 24 hours, followed by vacuum-drying at 120° C. for 10 hours to obtain a base membrane. Finally, the base membrane was soaked in phosphoric acid with a concentration of 85% at 80° C. for 20 hours, so that a composite membrane was obtained.

Embodiment 2

Step 1: 15 g of dicyandiamide was weighed and was placed in a crucible after sufficient grinding, then the crucible was put in a tubular furnace for calcination, and the tubular furnace was heated from room temperature to 550° C. with a heating rate of 5° C. $min^{-1}$ under an air atmosphere; the temperature was maintained for 4 hours after the temperature is increased to the set temperature, then the temperature was decreased along with the furnace; the calcined dicyandiamide was transferred into a mortar and was carefully ground into powder, and then the powder was washed with 1 M hydrochloric acid solution for 1.5 hours and with deionized water for 2 hours, respectively, and the obtained solid was dried in an oven at 60° C. Then the dried solid was mixed with 0.25 g of cerium nitrate, and then 50 g of deionized water was added to the mixture and magnetically stirred for 1 hour to obtain a suspension. Subsequently, 1 M KOH solution was added to the suspension to adjust the pH value of the suspension to 13, and then a solid precipitate was obtained by centrifugation after magnetic stirring for 2 hours. The solid precipitate was washed with large amounts of deionized water until the solution pH was neutral. Finally, the materials were completely dried in an oven and calcined at 250° C. for 2 hours under an air atmosphere, so that the composite $CeO_2@C_3N_4$ was obtained.

Step 2: 2.5 mg of the composite $CeO_2@C_3N_4$ was weighed and 10 ml of NMP was measured to mix, and the mixture was ultrasonically dispersed at an ultrasonic power of 100 W for 4 hours to obtain a dispersion liquid S1. 0.27 g of mPBI (poly-2,2'-(m-phenyl)-5, 5'-bibendazole) and 30 g of NMP were weighed, mixed and magnetically stirred, so that a PBI solution S2 was obtained after sufficient dissolution. S1 and S2 were uniformly mixed with stirring at a stirring power of 50 W for 6 hours to obtain a casting solution S3.

Step 3: the casting solution S3 was poured onto a grooved plate glass, and the plate glass was vacuum-dried at 80° C. for 24 hours, followed by vacuum-drying at 120° C. for 10 hours to obtain a base membrane. Finally, the base membrane was soaked in phosphoric acid with a concentration of 85% at 80° C. for 20 hours, so that a composite membrane was obtained.

Comparative Example 1

A composite high-temperature proton exchange membrane was prepared according to the method of Embodiment 1, and the calcined product of the dicyandiamide was not washed with hydrochloric acid.

Step 1: 15 g of dicyandiamide was weighed and was placed in a crucible after sufficient grinding, then the crucible was put in a tubular furnace for calcination, and the tubular furnace was heated from room temperature to 550° C. with a heating rate of 5° C. $min^{-1}$ under an air atmosphere; the temperature was maintained for 4 hours after the temperature is increased to the set temperature, then the temperature was decreased along with the furnace; the calcined dicyandiamide was transferred into a mortar and was carefully ground into powder, and then the power was mixed with 0.2 g of cerium nitrate, and 50 g of deionized water was added to the mixture and magnetically stirred for 1 hour to obtain a suspension. Subsequently, 1 M KOH solution was added to the suspension to adjust the pH value of the suspension to 13, and then a solid precipitate was obtained by centrifugation after magnetic stirring for 2 hours. The solid precipitate was washed with large amounts of deionized water until the solution pH was neutral. Finally, the materials were completely dried in an oven and calcined at 250° C. for 2 hours under an air atmosphere, so that composite the $CeO_2@C_3N_4$ was obtained.

Step 2: 0.12 mg of the composite $CeO_2@C_3N_4$ was weighed and 10 ml of NMP was measured to mix, and the mixture was ultrasonically dispersed at a ultrasonic power of 100 W for 4 hours to obtain a dispersion liquid S1. 0.27 g of mPBI (poly-2,2'-(m-phenyl)-5, 5'-bibendazole) and 30 g of NMP were weighed, mixed and magnetically stirred, so that a PBI solution S2 was obtained after sufficient dissolution. S1 and S2 were uniformly mixed with stirring at a stirring power of 50 W for 6 hours to obtain a casting solution S3.

Step 3: the casting solution S3 was poured onto a grooved plate glass, and the plate glass was vacuum-dried at 80° C. for 24 hours, followed by vacuum-drying at 120° C. for 10 hours to obtain a base membrane. Finally, the base membrane was soaked in phosphoric acid with a concentration of 85% at 80° C. for 20 hours, so that a composite membrane was obtained.

Comparative Example 2

A composite high-temperature proton exchange membrane was prepared by using polybenzimidazole and nanosheet $C_3N_4$ as raw materials.

Step 1: 15 g of dicyandiamide was weighed and was placed in a crucible after sufficient grinding, then the crucible was put in a tubular furnace for calcination, and the tubular furnace was heated from room temperature to 550° C. with a heating rate of 5° C. $min^{-1}$ under an air atmosphere; the temperature was maintained for 4 hours after the temperature is increased to the set temperature, then the temperature was decreased along with the furnace; the calcined dicyandiamide was transferred into a mortar and was carefully ground into powder, and then the powder was washed with 1 M hydrochloric acid solution for 1.5 hours and with deionized water for 2 hours, respectively; the obtained solid was dried in an oven at 60° C., so that $C_3N_4$ nanosheets were obtained.

Step 2: 0.12 mg of the $C_3N_4$ nanosheets was weighed and 10 ml of NMP was measured to mix, and the mixture was ultrasonically dispersed at a ultrasonic power of 100 W for 4 hours to obtain a dispersion liquid S1. 0.27 g of mPBI (poly-2,2'-(m-phenyl)-5, 5'-bibendazole) and 30 g of NMP were weighed, mixed and magnetically stirred, so that a PBI solution S2 was obtained after sufficient dissolution. S1 and S2 were uniformly mixed with stirring at a stirring power of 50 W for 6 hours to obtain a casting solution S3.

Step 3: the casting solution was poured onto a grooved plate glass, and the plate glass was vacuum-dried at 80° C. for 24 hours, followed by vacuum-drying at 120° C. for 10 hours to obtain a base membrane. Finally, the base membrane was soaked in phosphoric acid with a concentration of 85% at 80° C. for 20 hours, so that a composite membrane was obtained.

Comparative Example 3

A composite high-temperature proton exchange membrane was prepared by using polybenzimidazole and the nanosheet $CeO_2$ as raw materials.

Step 1: 0.2 g of cerous nitrate was weighed followed by adding 10 g of deionized water, and the mixture was magnetically stirred for 1 hour to obtain a suspension. Subsequently, 1 M KOH solution was added to the suspension to adjust the pH of the suspension to 13, and a solid precipitate was obtained by centrifugation after magnetic stirring for 2 hours. The solid precipitate was washed with large amounts of deionized water until the solution pH was neutral. Finally, the materials were completely dried in an oven and calcined at 250° C. for 2 hours under an air atmosphere, so that the nanoparticles $CeO_2$ was obtained.

Step 2: 0.12 mg of the nanoparticles $CeO_2$ was weighed and 10 ml of NMP was measured to mix, and the mixture was ultrasonically dispersed at a ultrasonic power of 100 W for 4 hours to obtain a dispersion liquid S1. 0.27 g of mPBI (poly-2,2'-(m-phenyl)-5, 5'-bibendazole) and 30 g of NMP were weighed, mixed and magnetically stirred, so that a PBI solution S2 was obtained after sufficient dissolution. S1 and S2 were uniformly mixed with stirring at a stirring power of 50 W for 6 hours to obtain a casting solution S3.

Step 3: the casting solution S3 was poured onto a grooved plate glass, and the plate glass was vacuum-dried at 80° C. for 24 hours, followed by vacuum-drying at 120° C. for 10 hours to obtain a base membrane. Finally, the base membrane was soaked in phosphoric acid with a concentration of 85% at 80° C. for 20 hours, so that a composite membrane was obtained.

Comparative Example 4

A composite high-temperature proton exchange membrane was prepared according to the method of Embodiment 1, with excessive doping of $CeO_2$.

Step 1: 15 g of dicyandiamide was weighed and was placed in a crucible after sufficient grinding, then the crucible was put in a tubular furnace for calcination, and the tubular furnace was heated from room temperature to 550° C. with a heating rate of 5° C. $min^{-1}$ under an air atmosphere; the temperature was maintained for 4 hours after the temperature is increased to the set temperature, then the temperature was decreased along with the furnace; the calcined dicyandiamide was transferred into a mortar and was carefully ground into powder, and then the powder was washed with 1 M hydrochloric acid solution for 1.5 hours and with deionized water for 2 hours, respectively; the obtained solid was dried in an oven at 60° C. Then the dried solid was mixed with 0.2 g of cerium nitrate, and then 50 g of deionized water was added to the mixture and magnetically stirred for 1 hour to obtain a suspension. Subsequently, 1 M KOH solution was added to the suspension to adjust the pH value of the suspension to 13, and a solid precipitate was obtained by centrifugation after magnetic stirring for 2 hours. The solid precipitate was washed with large amounts of deionized water until the solution pH was neutral. Finally, the materials were completely dried in an oven and calcined at 250° C. for 2 hours under an air atmosphere, so that the composite $CeO_2@C_3N_4$ was obtained.

Step 2: 0.12 mg of the composite $CeO_2@C_3N_4$ was weighed and 10 ml of NMP was measured to mix, and the mixture was ultrasonically dispersed at a ultrasonic power of 100 W for 4 hours to obtain the dispersion liquid S1. 0.27 g of mPBI (poly-2,2'-(m-phenyl)-5, 5'-bibendazole) and 30 g of NMP were weighed, mixed and magnetically stirred, so that a PBI solution S2 was obtained after sufficient dissolution. S1 and S2 were uniformly mixed with stirring at a stirring power of 50 W for 6 hours to obtain a casting solution S3.

Step 3: the casting solution S3 was poured onto a grooved plate glass, and the plate glass was vacuum-dried at 80° C. for 24 hours, followed by vacuum-drying at 120° C. for 10 hours to obtain a base membrane. Finally, the base membrane was soaked in phosphoric acid with a concentration of 85% at 80° C. for 20 hours, so that a composite membrane was obtained.

Comparative Example 5

Step 1: 15 g of dicyandiamide was weighed and was placed in a crucible after sufficient grinding, then the crucible was put in a tubular furnace for calcination, and the tubular furnace was heated from room temperature to 550° C. with a heating rate of 5° C. $min^{-1}$ under an air atmosphere; the temperature was maintained for 4 hours after the temperature is increased to the set temperature, then the temperature was decreased along with the furnace; the calcined dicyandiamide was transferred into a mortar and was carefully ground into powder, and then the powder was washed with 1 M hydrochloric acid solution for 1.5 hours and with deionized water for 2 hours, respectively; and the obtained solid was dried in an oven at 60° C.

Step 2: 0.2 g of cerium nitrate was weighed and was added in 10 g of deionized water, the mixture was magnetically stirred for 1 hour to obtain a suspension. Subsequently, 1 M KOH solution was added to the suspension to adjust the pH value of the suspension to 13, and a solid precipitate was obtained by centrifugation after magnetic stirring for 2 hours. The solid precipitate was washed with large amounts of deionized water until the solution pH was neutral. Finally, the materials were completely dried in an oven and calcined at 250° C. for 2 hours under an air atmosphere, so that the nanoparticles $CeO_2$ was obtained.

Step 3: 0.10 mg of $C_3N_4$ and 0.02 mg of $CeO_2$ were weighed and 10 ml of NMP was measured to mix, and the mixture was ultrasonically dispersed at an ultrasonic power of 100 W for 4 hours to obtain the dispersion liquid S1. 0.27 g of mPBI (poly-2,2'-(m-phenyl)-5, 5'-bibendazole) and 30 g of NMP were weighed, mixed and magnetically stirred, so that a PBI solution S2 was obtained after sufficient dissolution. S1 and S2 were uniformly mixed with stirring at a stirring power of 50 W for 6 hours to obtain a casting solution S3.

Step 4: the casting solution S3 was poured onto a grooved plate glass, and the plate glass was vacuum-dried at 80° C. for 24 hours, followed by vacuum-drying at 120° C. for 10 hours to obtain a base membrane. Finally, the base membrane was soaked in phosphoric acid with a concentration of 85% at 80° C. for 20 hours, so that a composite membrane was obtained.

The composite membranes prepared in the embodiments and the comparative examples were tested by the scanning electron microscopy (SEM), and the results are shown in FIG. 1. It can be seen from FIG. 1 that, in the composite $CeO_2@C_3N_4$ of Embodiment 1, the amount of $CeO_2$ is moderate and $CeO_2$ is uniformly distributed on the surface of $C_3N_4$, so that the tolerance to the free radicals can be improved without reducing the conductivity and tensile strength.

The composite membranes prepared in embodiments and comparative examples were tested for conductivity and tensile strength, and the results are shown in Table 1. It can be seen from Table 1 that the conductivity and tensile strength of the composite membranes of the present invention are both improved, and the effects thereof is better than those of the Comparative examples 1 to 5.

TABLE 1

| Case | Conductivity/S · $cm^{-1}$ | Tensile strength/MPa |
|---|---|---|
| Embodiment 1 | 0.048 | 17.3 |
| Embodiment 2 | 0.054 | 17.8 |
| Comparative example 1 | 0.036 | 16.8 |

TABLE 1-continued

| Case | Conductivity/S · $cm^{-1}$ | Tensile strength/MPa |
|---|---|---|
| Comparative example 2 | 0.043 | 16.5 |
| Comparative example 3 | 0.034 | 14.2 |
| Comparative example 4 | 0.038 | 15.9 |
| Comparative example 5 | 0.044 | 16.7 |

The composite membrane un-soaked in phosphoric acid in Embodiments 1 and PBI/$CeO_2$@$C_3N_4$ composite membranes un-soaked in phosphoric acid in Comparative examples 1 to 5 were immersed in Fenton reagent for durability test, and the results are shown in Table 2.

TABLE 2

| Case | Mass residual rate of composite membrane after 100 hours/% |
|---|---|
| Embodiment 1 | 93 |
| Embodiment 2 | 95 |
| Comparative example 1 | 85 |
| Comparative example 2 | 81 |
| Comparative example 3 | 87 |
| Comparative example 4 | 90 |
| Comparative example 5 | 89 |

As can be seen from the table, due to $C_3N_4$ in Comparative example 1 was not treated with hydrochloric acid, resulting in more agglomeration of $C_3N_4$ and more agglomeration of $CeO_2$, so that the $CeO_2$@$C_3N_4$ composite does not significantly improve the conductivity and tensile strength, and the effect on durability is also limited. In the present application, $C_3N_4$ is treated with hydrochloric acid, so that the $C_3N_4$ is protonated, which is helpful for the dispersion of $C_3N_4$ and improves the proton conductivity. Therefore, the operation of treating $C_3N_4$ with hydrochloric acid is necessary. $C_3N_4$ treated with hydrochloric acid has more layered structures; Comparative example 2 is only doped with the treated $C_3N_4$, which can significantly improve the conductivity and tensile strength of the composite membrane. However, the durability of the composite membrane is poor due to the absence of free radical quencher $CeO_2$. Comparative example 3 is only doped with $CeO_2$, but $CeO_2$ itself does not conduct protons, nor can it transfer stress, so that the proton conductivity and tensile strength of the composite membrane are decreased. In Comparative example 4, the amount of $CeO_2$ is excessive, which covers part of the active sites where $C_3N_4$ react with phosphoric acid, thereby reducing the contact area between $C_3N_4$ and phosphoric acid as well as between PBI resin and phosphoric acid, resulting in limited effects on improving proton conductivity and tensile strength. In Comparative example 5, $CeO_2$ and $C_3N_4$ were added, so that the two substances do not interact well with each other, and quenching of free radicals and adsorption anchoring of phosphoric acid cannot be achieved at the same site at the same time. In summary, Embodiment 1 has the best implementation effect.

The mechanism of proton conduction of the high-temperature composite membrane in the present application is to use g-$C_3N_4$ to adsorb and anchor phosphoric acid, increase the adsorption capacity and bonding effect of the composite membrane to phosphoric acid, and reduce the loss rate of phosphoric acid (see Table 4). The present invention uses a density-functional calculation to describe in detail the mechanism that g-$C_3N_4$ adsorbs phosphoric acid to promote the improvement of the composite membrane conductivity (see FIG. 3 and Table 3).

TABLE 3

| Changes of bond length of phosphoric acid molecules before and after adsorption to g-$C_3N_4$ | | | | | |
|---|---|---|---|---|---|
| $H_3PO_4^{-1}$ | Before adsorption/Å | After adsorption/Å | $H_3PO_4^{-2}$ | Before adsorption/Å | After adsorption/Å |
| (O1—H1) | 1.03 | 0.99 | (O5—H4) | 1.03 | 0.99 |
| (O3—H2) | 0.99 | 1.15 | (O7—H5) | 0.99 | 1.15 |
| (O4—H3) | 1.03 | 0.99 | (O8—H6) | 1.03 | 0.99 |
| (P1—O1) | 1.57 | 1.57 | (P2—O5) | 1.57 | 1.57 |
| (P1═O2) | 1.52 | 1.51 | (P2═O6) | 1.52 | 1.51 |
| (P1—O3) | 1.57 | 1.62 | (P2—O7) | 1.57 | 1.62 |
| (P1—O4) | 1.56 | 1.57 | (P2—O8) | 1.56 | 1.57 |

Figure 3:
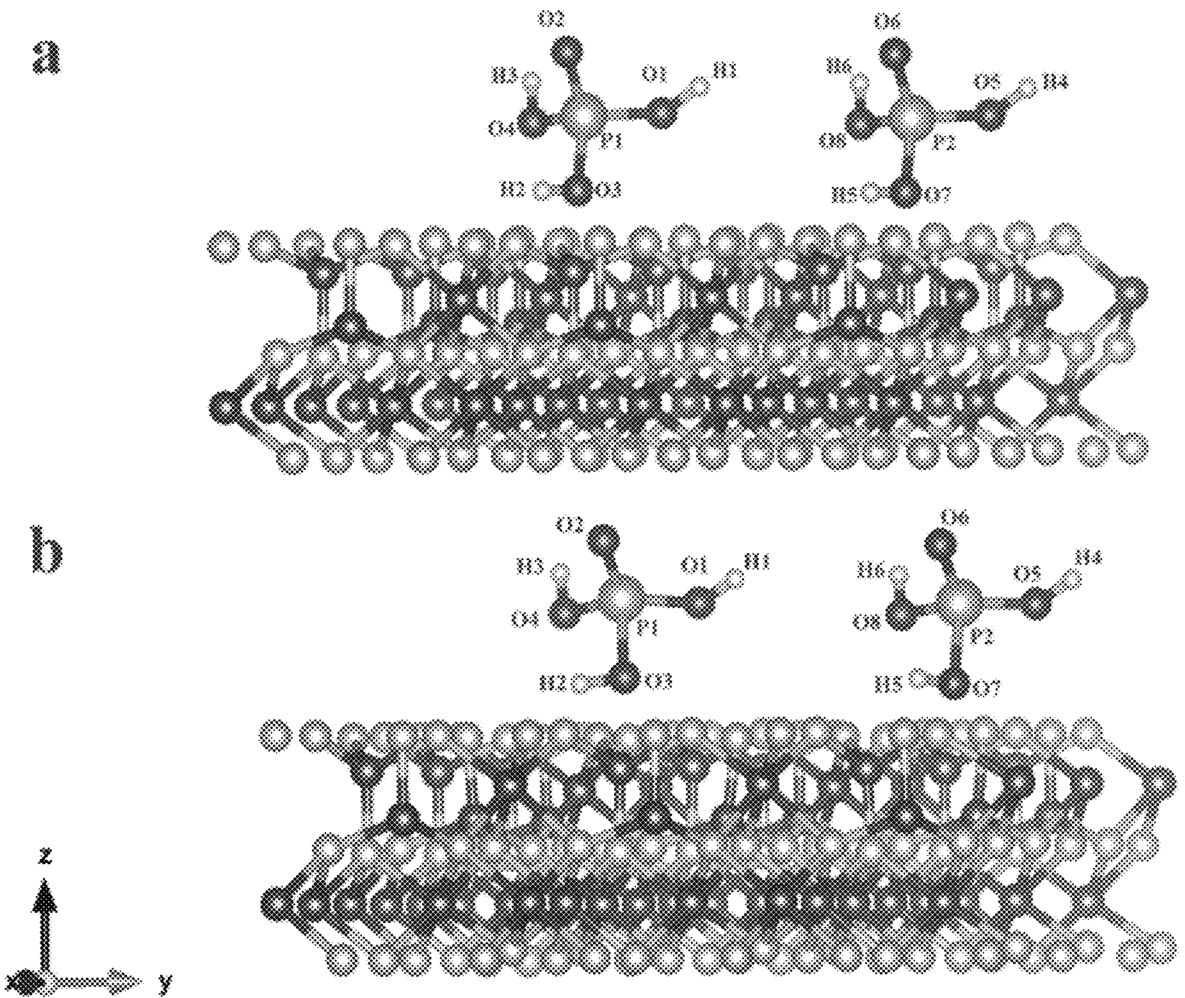
FIG. 3 shows diagrams of interaction model of g-$C_3N_4$ and phosphoric acid molecules. panel a—before adsorption, and panel b—after adsorption.

As shown in FIG. 3 and Table 3, according to results of the density-functional calculation, the bond length of P—O bond (P1-O3, P2-O7) in the phosphoric acid molecule changes from 1.57 Å to 1.62 Å, and the bond length of H—O bond (H2-O3, H5-O7) changes from 0.99 Å to 1.15 Å, which means that phosphoric acid can be further adsorbed on the surface of g-$C_3N_4$, so that is easier to dissociate protons and improves the proton conductivity of the composite membrane. This is the mechanism that g-$C_3N_4$ improves the conductivity of the composite membrane described in the present invention.

TABLE 4

| Mass of remaining phosphoric acid in composite membrane after 72 hours under 40% relative humidity at 80° C. | |
|---|---|
| Case | Retention rate of phosphoric acid in composite membrane after 72 hour/% |
| Embodiment 1 | 81.4 |
| Embodiment 2 | 80.9 |
| Comparative example 1 | 78.2 |
| Comparative example 2 | 75.5 |
| Comparative example 3 | 68.7 |
| Comparative example 4 | 73.2 |
| Comparative example 5 | 76.3 |

As shown in Table 4, Embodiment 1 has the optimal phosphoric acid retention rate, indicating that the method of the present invention can improve the retention rate of phosphoric acid in the composite membrane, and significantly reduce the loss rate of phosphoric acid.

For any skilled in the art, without departing from the scope of the technical solution of the present invention, many possible changes and modifications can be made to the technical solution of the present invention by using the technical contents disclosed above, or modified into equivalent embodiments with equivalent changes. Therefore, any simple modification, equivalent change and modification made to the above embodiments according to the technical essence of the present invention without departing from the contents of the technical solution of the present invention shall still belong to the protection scope of the technical solution of the present invention.

The invention claimed is:

1. A preparation method of a composite proton exchange membrane, comprising:

ultrasonically dispersing a composite A@B in a first polar aprotic solvent to obtain a dispersion liquid S1;

dissolving polybenzimidazole (PBI) in a second polar aprotic solvent, and obtaining a PBI solution S2 after stirring and heating; and mixing S1 and S2 to obtain a casting solution S3, casting S3 onto a grooved plate glass to obtain a membrane, and soaking the membrane in phosphoric acid after drying to obtain the composite proton exchange membrane, wherein the composite A@B comprises a component A and a component B, the component A are nanoparticles with free radical quenching function, the component B is a nanosheet of $C_3N_4$, and a mass ratio of component A to component B in the composite A@B is 1:1-1:20.

2. The preparation method according to claim 1, wherein a mass concentration of the composite A@B in the dispersion liquid S1 is 0.05-2 mg/10 ml; and a mass fraction of polybenzimidazole in the solution S2 is 0.8-5 wt. %.

3. The preparation method according to claim 2, wherein the first and second polar aprotic solvents are independently selected from one or more of N, N-dimethylformamide (DMF), N, N-dimethylacetamide (DMAc), and N-methyl-2 pyrrolidone (NMP).

4. The preparation method according to claim 2, wherein the ultrasonically dispersing step is carried out at an ultrasonic power is 50-300 W for 0.5-6 hours; wherein S1 and S2 are mixed with magnetic stirring at a stirring power of 50-100 W for 1-12 hours; and soaking the membrane is carried out with phosphoric acid having a concentration of 50-85% at 50-150° C. for 6-24 hours.

5. The preparation method according to claim 1, further comprising:

(1) calcining dicyandiamide after grinding, grinding the calcined dicyandiamide into powder, washing the powder with a 0.25-1.5M hydrochloric acid solution for 0.5-3 hours and with deionized water for 0.5-2 hours, and drying the obtained solid; and (2) mixing the solid obtained in step (1) with a precursor of nanoparticles with free radical quenching function to prepare a suspension, adding a 0.5-2.5M KOH solution into the suspension so that the pH value of the suspension is 12-14, stirring and centrifuging the suspension to obtain a precipitate, washing the precipitate with water to neutral, and calcining the precipitate after drying to obtain the composite A@B.

6. The preparation method accord to claim 5, wherein in step (1), a mass ratio of dicyandiamide to the precursor of the nanoparticles with free radical quenching function is 15:1 to 5:1; calcining conditions are of heating from room temperature to 500-600° C. at a heating rate of 3-8° C. $min^{-1}$ in an air atmosphere, and maintaining the temperature for 3-6 hours after heating to a set temperature; a drying temperature is 60° C.; and calcining conditions in step (2) are of calcining for 2 hours in an air atmosphere at 250° C.

7. The preparation method accord to claim 1, wherein the polybenzimidazole is at least one of mPBI (poly 2,2'-(m-phenyl)-5,5'-bibenzimidazole), ABPBI (poly(2,5-benzimidazole)), OPBI (poly 2,2'-(p-diphenyl ether)-5,5'-bibenzimidazole), PBI with sulfonic acid group side chain, PBI with phosphonic acid group side chain, and hyperbranched PBI, and the component A are nanoparticles of one or more metal oxide selected from $MnO_2$, $Mn_2O_3$, $Fe_3O_4$, $TiO_2$, and $CeO_2$.

* * * * *